June 5, 1928. 1,672,323
E. KELLENBERGER
AUTOMATIC DRIVE FOR SPEED REGULATORS FOR SELF ACTING INCLINED PLANES
Filed April 12, 1926
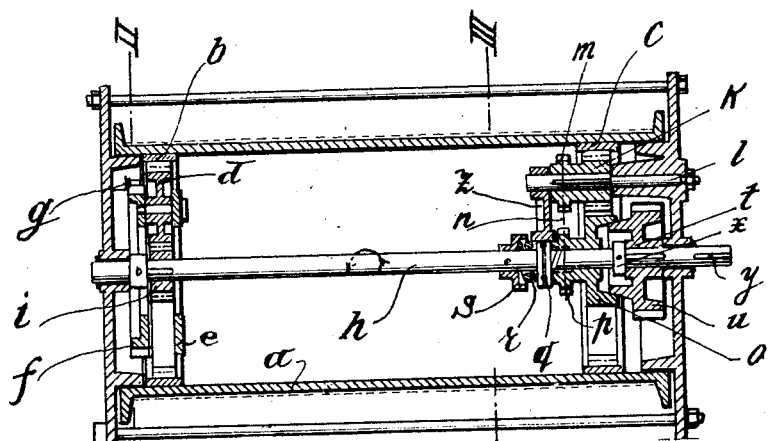
Fig. 1.
Fig. 2.
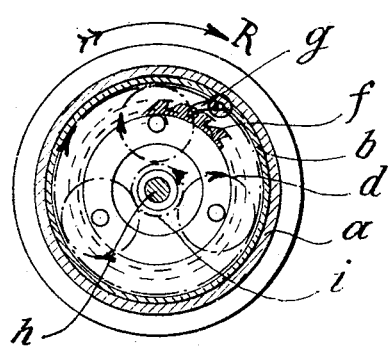
Fig. 3.
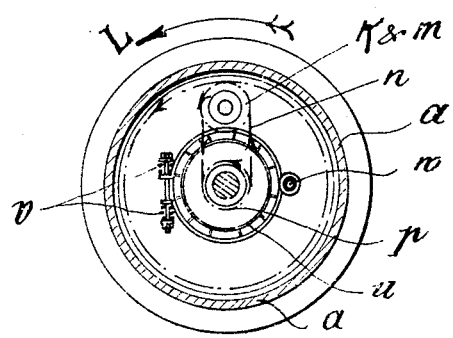

Patented June 5, 1928.

1,672,323

UNITED STATES PATENT OFFICE.

EMIL KELLENBERGER, OF STEIN, AARGAU, SWITZERLAND.

AUTOMATIC DRIVE FOR SPEED REGULATORS FOR SELF-ACTING INCLINED PLANES.

Application filed April 12, 1926, Serial No. 101,509, and in Germany May 2, 1925.

The invention relates to automatic speed regulating devices for use in connection with gravity-operated hauling gear of the kind in which endless cables are used, both on the same drum, or two open cables, which are alternately and successively wound upon, and unwound from, a single drum, full tubs or the like being allowed to travel down an incline by one of the cables while "empties" are hauled up by the other cable. With hauling gear of this kind a brake must be used to absorb the excess of power supplied by the descent of the full tubs, and the brake mechanism must be effective for both directions of rotation of the drum. Differential band brakes, automatic centrifugal brakes, and hydraulic Martin brakes have been used, some being automatically operative in both directions, and some being manually controlled. Centrifugal brakes have not proved successful in practice, which may be due to the fact that adequate experience in the design thereof, for the fairly large power involved, has not been acquired. With hydraulic brake mechanism two brakes have been used, one for each direction of rotation.

According to my invention I mount inside the drum a brake shaft, and fix inside the drum two internally toothed rings, each engaged with a train of gear for rotating the said shaft at a speed exceeding that of the drum, one train of gears being operative when the drum rotates in one direction, and other being operative when the rotation of the drum is reversed, and both trains of gears rotating the shaft in the same direction.

The brake is thus applied to a shaft which always rotates in the same direction, at a speed exceeding that of the drum.

An apparatus according to the invention is shown by way of example in the annexed drawing, in which Fig. 1 is a longitudinal section thereof, Figs. 2 and 3 being respectively sections on the lines I—I and II—II of Fig. 1.

The drum $a$ has fixed within it, near the left-hand end (Fig. 1) an internally toothed ring $b$, with which planet gears $d$ are in mesh, the axles of the planet gears being journalled on one side in a flat ring $e$ and on the other side in a large ratchet wheel $f$. The drum is rotatable on circular flanges of two fixed head plates, and the ratchet wheel $f$ is engaged with a pawl $g$ pivoted to head plate seen on the left of Fig. 1. Instead of a single pawl, I may provide several pawls distributed about the ratchet wheel. The planet gears mesh with a pinion $i$ fixed to a rotatable brake shaft $h$, which is coaxial with the drum and is journalled in the two head plates.

Near the right hand end of the drum $a$ there is another internally toothed ring marked $c$, meshing with a pinion $k$ keyed to a shaft $l$ journalled in a boss on the adjacent head plate, this shaft having also fixed to it a sprocket wheel $m$ connected by a noiseless gear chain $n$ to a sprocket wheel $p$, which is integral with a cone-clutch member $o$. The eye of the sprocket wheel $p$ enages the shaft $h$ by means of a short raised screw thread of fine pitch, engaging a raised thread on the shaft, so that the wheel $p$ and clutch member $o$ can be moved axially on the shaft by means of the screw threads, but can also rotate freely after a certain axial displacement. Fixed to the shaft $h$ is a collar $s$ forming a seat for a spring $r$, whereby two slidable and rotatable disks having a ball bearing $q$ between them are thrust towards the sprocket wheel $p$ and thus tend to hold the clutch member $o$ in engagement with the coacting clutch member $t$, the latter being axially immovable between the right-hand head plate and a collar $x$ fixed to the shaft $h$. The clutch member $t$ is integral with the drum of a band brake $u$, which is carried by a stud $w$ projecting from the adjacent head plate, and whose grip is regulatable by means of nuts and springs $v$. The shaft $h$ has an extension $y$ outside the head plate, for connection with a regulating brake of any convenient type, which is not shown, and the fixed part of which may be carried by the head plate.

When the drum is rotated in the direction of the arrow R (Fig. 2) by the pull of the rope which is being unwound the pawl g prevents rotation of the ratchet wheel $f$ in the same direction, so that the planet gears cannot roll on the pinion $i$, but drive the said pinion, with the shaft $h$, at a speed exceeding that of the drum. The power applied to the shaft $h$ is in small part absorbed by the brake $u$, and the thread within the eye of the sprocket wheel $p$ causes the latter to move slightly to the left, so that the clutch member $o$ if fully disengaged and the wheel $p$ is able freely to rotate on the shaft $h$, which is braked by the brake to which it is connected at $y$.

When the rotation of the drum is reversed, as indicated by the arrow L in Fig. 3, for unwinding the other rope, the planet wheels $d$ are able to roll on the pinion $i$, as the pawl $g$ does not lock the ratchet wheel $f$. A stirrup or the like, not shown in the drawing, may be provided for lifting the pawl, to prevent chattering. With the drum rotating in this reversed direction the spring $s$ is able to shift the wheel $p$ and clutch member $o$ to the right, so that the clutch is engaged, and the drum, by means of the toothed ring $c$, pinion $k$ and sprocket gears, drives the shaft $h$ in the same direction as before, and still with the external brake acting on the part $y$ of the shaft.

It will be noted that the external brake acts on a shaft rotating always in the same direction, and at a higher speed than the drum. The high speed of the shaft enables a centrifugal brake of the required power to be designed and used more efficiently than is the case with centrifugal brakes for low speed work. If hydraulic brake mechanism is used the same is simplified by the fact that the shaft always rotates in the same direction, it not being necessary to use two hydraulic brakes, and the high speed of the shaft is generally of advantage in this case also. The gear can be made to work quite automatically, with open cables, by providing automatic stop and reversing devices, and no brake-man is required at the winch. The workman who attaches the tubs to the rope can release the stop brake by pulling a cord or the like.

I claim:—

1. Speed-regulating mechanism for gravity operated hauling gear wherein a rope-drum is rotated in opposite directions alternately, comprising two internally toothed gear rings fixed within the drum, a brake shaft rotatable within the drum, a train of gears including planet-gears and ratchet mechanism actuated by one of said gear rings for rotating said shaft in one direction, a train of gears including sprocket gears actuated by the other gear ring for rotating said shaft in the same direction, and means whereby the gear train including sprocket gears is rendered inoperative when the drum rotates in the direction in which the other gear train is operative, the speed given to the shaft by both gear trains exceeding that of the drum.

2. Speed regulating mechanism as claimed in claim 1, wherein the planet gears are meshed with one of the gear rings and with a pinion fixed to the shaft, and are journalled in a ratchet wheel engaged with a stationary pawl.

3. Speed regulating mechanism as claimed in claim 1, wherein a sprocket wheel included in the sprocket gear is axially movable on the shaft by means of a raised screw-thread, which allows it freely to rotate on the shaft after axial displacement in one direction, said wheel having connected thereto a clutch-member, which is engaged with a clutch member fixed to the shaft by axial movement of the wheel in the other direction, the fixed clutch member being braked.

In testimony whereof I affix my signature.

EMIL KELLENBERGER.